United States Patent [19]

Joseph

[11] 3,830,207
[45] Aug. 20, 1974

[54] SYSTEM FOR CONTROLLING THE IGNITION AND INJECTION OF INTERNAL COMBUSTION ENGINES

[75] Inventor: Sauvignet Henri Joseph, Paris, France

[73] Assignee: Compteurs Schlumberger, Montrouge, France

[22] Filed: Feb. 9, 1973

[21] Appl. No.: 330,922

[30] Foreign Application Priority Data
Sept. 2, 1972  France .................................. 72.4371

[52] U.S. Cl........ 123/32 EA, 123/148 E, 123/90.11
[51] Int. Cl............................. F02b 3/00, F02p 1/00
[58] Field of Search.......... 123/148 E, 32 EA, 90.11

[56] References Cited
UNITED STATES PATENTS
3,418,989  12/1968  Silverman........................ 123/148 E
3,682,152  8/1972  Muller-Berner ................. 123/90.11
3,741,176  6/1973  Schmidt ........................... 123/148 E Primary Examiner—Laurence M. Goodridge
Assistant Examiner—Ronald B. Cox
Attorney, Agent, or Firm—William R. Sherman

[57] ABSTRACT

Apparatus for controlling ignition and injection in internal combustion engines. The apparatus includes a first wiper carried by the engine crankshaft and having a series of identical sectors, a proximity detector assembly mounted opposite this crankshaft wiper, and also a timing wiper carried by the engine camshaft and having sectors the number of which varies with the number of cylinders in the engine, a second proximity detector associated with the timing wiper, a logic-circuit-type comparison device connected to the proximity detector to deliver a signal which is a function of the position of the engine pistons, and a device for controlling the engine ignition, the input of this controlling device being connected to the output of the logic circuit.

5 Claims, 6 Drawing Figures

SYSTEM FOR CONTROLLING THE IGNITION AND INJECTION OF INTERNAL COMBUSTION ENGINES

BACKGROUND OF THE INVENTION

This invention relates to ignition and injection systems and more particularly to a system for controlling the ignition and injection of fuel in internal combustion engines operating according to the four-stroke cycle. It has particular application to engines in which the number and arrangement of cylinders are such that there is no regular repetition of the ignition angles for each crankshaft rotation. This is notably the case of single-cylinder, as well as three, six and 12-cylinder engines. For example, in the case of a six-cylinder V-engine, the pistons successively reach their top dead center after crankshaft rotations of 90° and 150° respectively so that the cycle is repetitive only after a 720° rotation of the crankshaft and the ignition must of course take place before each piston passes its top dead center, with a variable angle depending on the operating conditions of the engine.

It is an object of the present invention to provide a system in which ignition is produced with greater precision than in prior-art systems.

SUMMARY OF THE INVENTION

According to the invention, a system is provided which comprises, on the crankshaft, a crankshaft wiper having defined thereon a series of identical sectors separated by notches which are also identical and designed with an angle in the center having a common divisor with the successive angles made by the pistons between their respective dead centers during a complete engine operating cycle, a proximity detector assembly stationarily mounted near the crankshaft wiper and comprising at least one sensor, the number of sensors depending on the number of wiper sectors and on the cycle of the engine, so that for a dead center of each piston one end of a sector of the wiper is lined up with a sensor of the proximity detector assembly which thus produces at least one series of signals terminating at a dead center of each piston, a timing wiper carried by the engine camshaft rotating at half the speed of the crankshaft, this timing wiper having alternating sectors and notches the number of which is equal to no more than the number of cylinders in the engine and the arrangement of which corresponds to the angular offset of the cycles specific to each cylinder of the engine, a proximity detector having a sensor stationarily mounted near the said timing wiper and forming, with the end of each sector corresponding to the dead center of a piston, a lead angle whose value is at least equal to half the absolute value of the error angle which may exist between the crankshaft and the camshaft, so that the said proximity detector of the timing wiper forms successive signals in advance with respect to the considered dead center of each piston but with unprecise leading and trailing edges, a logic-circuit-type comparison device connected to the proxmity detector assembly of the timing wiper and causing the generation of a resultant signal, in advance with respect to the said dead center of each piston, whenever a correspondence exists between at least the beginning of one of the signals coming from the crankshaft wiper and one of the signals from the timing wiper, so that the imprecision of the signal coming from the timing wiper is corrected by the signals coming from the crankshaft wiper, and a device for calculating an ignition advance curve or an amount of fuel to be injected, connected at the output of the logic-circuit device to be controlled from the beginning of the said resultant signal.

Other features and advantages of the invention will appear from the following description of an illustrative embodiment, with reference to the appended drawings in which:

DESCRIPTION OF THE PREFERRED EMBODIMENT OF THE INVENTION

Figure 1:
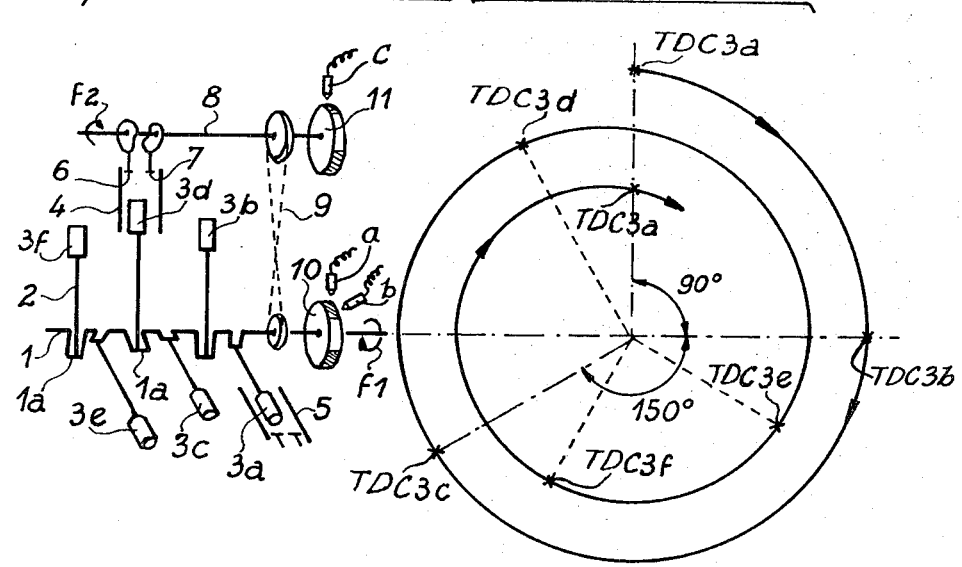
FIG. 1 is a schematic perspective view of an internal combustion engine applying the system of the invention.

FIG. 1 shows an engine including a crankshaft 1 on which are attached the big ends of the connecting rods 2, the small ends of which are attached to pistons 3a to 3f sliding in two rows of cylinders 4 and 5 in a V-arrangement. Each cylinder of the rows 4 and 5 comprises intake valves 6 and exhaust valves 7 whose movement is controlled by a camshaft 8 driven by the crankshaft 1 by means of a chain 9, a gear belt or other means of transmission known to the art, so that the said camshaft 8 rotates at half the speed of the crankshaft 1. It will be considered hereinafter that the camshaft 8 and the crankshaft 1 rotate in opposite directions, but it is evident that the invention would not be modified if the camshaft were designed to rotate in the same direction as the crankshaft.

In the V-six type engine to which the description refers the crank pins 1a of the crankshaft 1 are offset angularly with respect to each other so that, for any chosen firing order of the fuel mixture in the different cylinders, the pistons reach their top dead center for successive angular offsets of 90° and 150°.

By way of example, and assuming that the firing order of the fuel mixture in the different cylinders corresponding to the order in which the different pistons are successively referenced in the drawing, for a complete engine operating cycle, the piston 3a is at its top dead center at the point TDC 3a, the piston 3b at the point TDC 3b which is 90° from the preceding point, the piston 3c at the point TDC 3c which is 150° from the preceding point, and so on, and finally, the piston 3f is at the point TDC 3f 90° from the preceding point. As shown in the right-hand part of FIG. 1, two complete revolutions of the crankshaft 1 have occurred when the piston 3a returns to the dead center TDC 3a which is 150° from the preceding. In other words, a 720° rotation of the crankshaft, corresponds to a rotation of only 360° of the camshaft 8, since the latter is driven at half the speed of the crankshaft. To allow the sensing of the position of the crankshaft at all times, it carries, as shown in FIG. 1, a detection element or sensor 10, hereinafter called the crankshaft wiper. In a similar manner, the camshaft 8 is provided with a detection element or sensor 11, hereinafter called the timing wiper.

Figure 2:
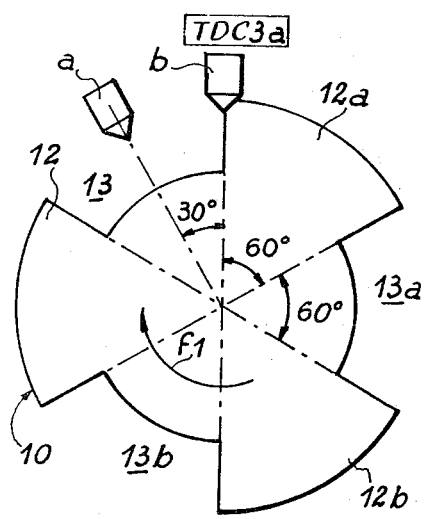
FIGS. 2 and 2a are schematic elevations of marking elements included in the system.

FIG. 2 represents an embodiment in which the crankshaft wiper 10 is constructed in the form of a disc having three projecting sectors 12, 12a and 12b separated by notches or intervals 13, 13a, 13b, the limits of said sectors and the said notches each subtending the same angle, i.e., in the considered example, an angle of 60°. The crankshaft wiper 10 and the timing wiper 11 can of course be designed in a different manner. For example, the disc can be circular and the projecting sectors 12 to 12b can consist of metallic or magnetic parts, with notches consisting of nonmetallic or nonmagnetic parts.

In the embodiment of FIGS. 1 to 5, are provided, opposite the crankshaft wiper 10, a first sensing mechanism $a$ and a second sensing mechanism $b$ separated from each other by an angular distance of 30°.

For example, the sensor $b$ is set to correspond to the point TDC 3a and, considering the rotation direction of the crankshaft shown by the arrows $f_1$, the sensor $a$ is set 30° in advance of the sensor $b$.

From the preceding it will be seen that, considering the rotating direction of the crankshaft, the sensor $a$ in the position shown in FIG. 2 transmits a first type of information which corresponds to the representation of the notch 13, while the sensor $b$ just terminates the transmission of information of another type which corresponds to the representation of the sector 12a.

Figure 2A:
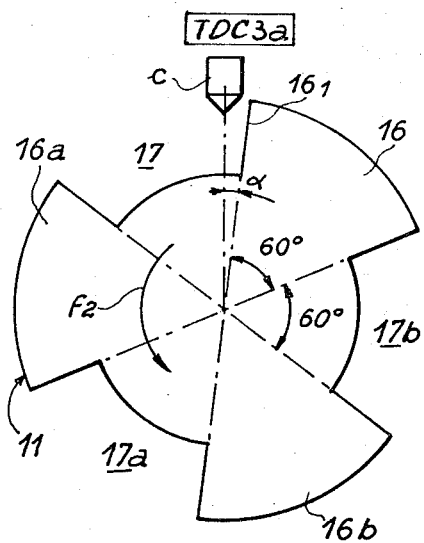

As shown in FIG. 2a, the timing wiper 11, which rotates as shown by the arrow $f_2$, is made the same way as the crankshaft wiper 10 described above and has sectors 16, 16a and 16b separated by notches 17, 17a and 17b respectively having an angular opening of 60°. A sensing mechanism $c$ is placed opposite the timing wiper 11 so that the leading edge $16_1$ of the sector 16 lags by an angle $\alpha$ with respect to the position of the top dead center of the piston 3a. The same is obviously true as regards the leading edges of the other sectors 16a and 16b which are offset by the same angle with respect to the top dead center of the pistons of each of the two rows of cylinders 4 and 5.

As already explained above, the imprecision or tolerance of the setting of the camshaft 8 can correspond to an error of plus or minus 10°. Since the timing wiper 11 rotates at half the speed of the crankshaft wiper, this imprecision is consequently reduced to plus or minus 5° as regards the setting of this wiper. Consequently, by choosing the angle $\alpha$, for example, equal to 7.5°, there is the assurance that the information transmitted by the sensing mechanism $c$, when a notch 17, 17a or 17b coincides with it, always covers the maximum setting error possible between the crankshaft and the camshaft.

The signals produced at the output of each sensor come in the form of voltage signals which are shaped in suitable circuits 21, 22 and 23 (FIG. 3) intended for forming signals A, B, C, of a type which depends on the arrangement chosen for implementing the system of the invention. In other words, the signals A, B and C can come in the form of squarewave voltage signals if the system is designed with electronic components, or equivalent signals if this system is designed with pneumatic components, for example.

Figure 4:
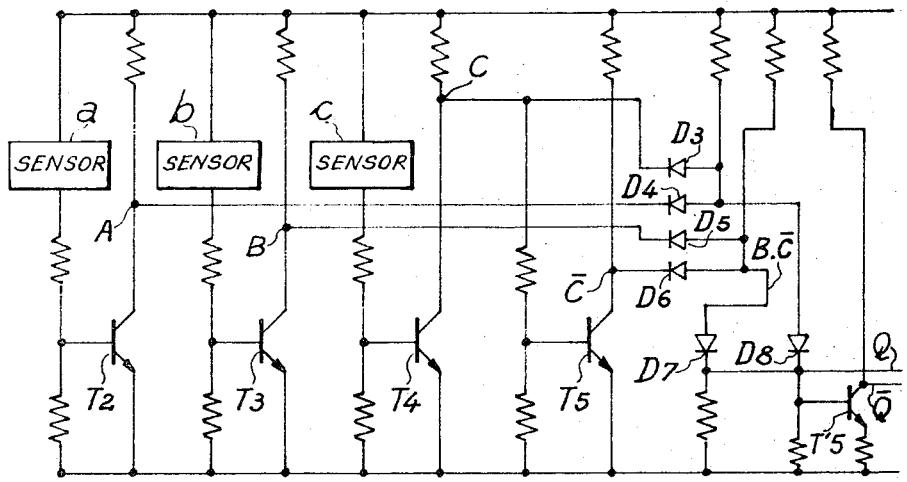
FIG. 4 is a diagram showing a particular embodiment of the logic diagram of FIG. 3.

In the case of the electronic design of the system of the invention, referring to FIG. 4, the signals A, B and C are obtained in the emitter-collector circuit of transistors $T_2$, $T_3$ and $T_4$ respectively whose bases receive the rectified voltage signal available at the output terminals of the sensors $a$, $b$ and $c$.

Figure 5:
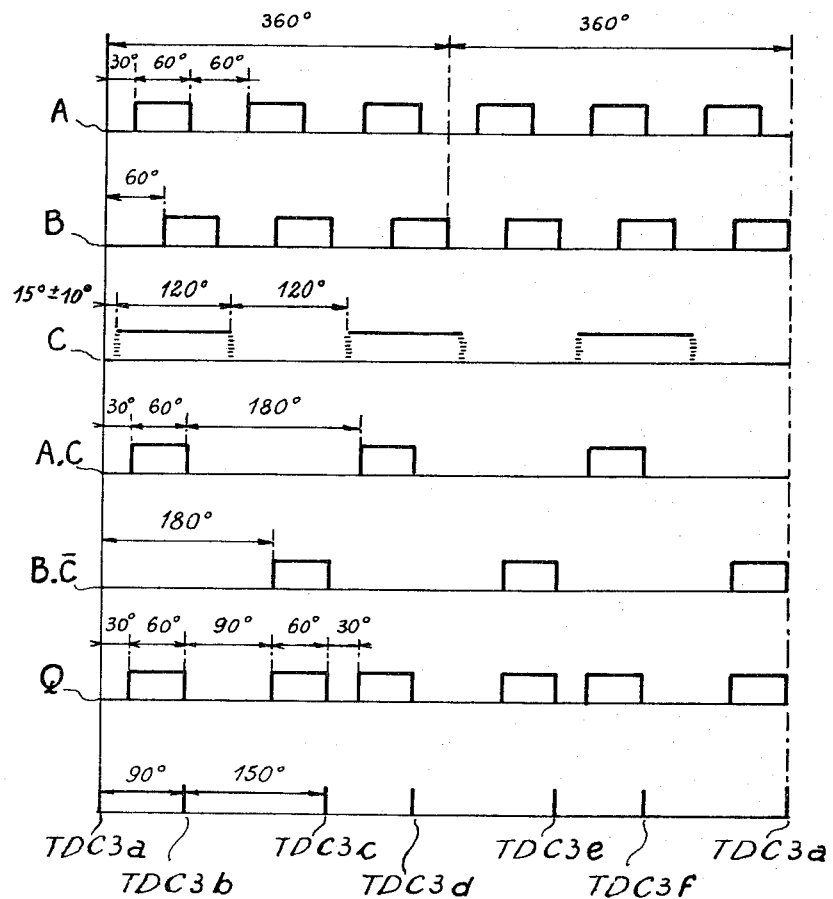
FIG. 5 is a waveform diagram illustrating the position of signals produced by the system in its embodiment according to FIGS. 3 and 4.

Considering the foregoing explanations and referring to FIG. 5, it is noted that the sensor $a$ begins to deliver a signal A of state 1 30° after the piston 3a passes the top dead center and that this signal A corresponds to the angular opening of the sector 12; that is, to 60°. No signal A then appears for 60°, and then a new signal A is generated and so on.

As regards the sensor $b$ which is set with a lag of 30° with respect to the sensor $a$, the signals B of state 1 which it produces are consequently lagging by 30° with respect to the signals A, and the said signals B obviously correspond to the same rotation angle of the crankshaft, since they also come from the successive passage of the sectors and notches of the crankshaft wiper.

In the same manner, the signal C, formed in the emitter-collector circuit of transistor $T_4$ which constitutes the shaping circuit 23, corresponds to the successive passage of the sectors 16, 16a and 16b whose angular opening is 60°. However, as the timing wiper 11 rotates at half the speed of the crankshaft wiper, the said signals C corresponds to 120° of crankshaft rotation, but in view of the imprecision of the setting between the crankshaft and the camshaft, the leading and trailing edges of the signals C are indeterminate because, owing to the said setting imprecision, the said leading and trailing edges exhibit the same error as the setting error.

Figure 3:
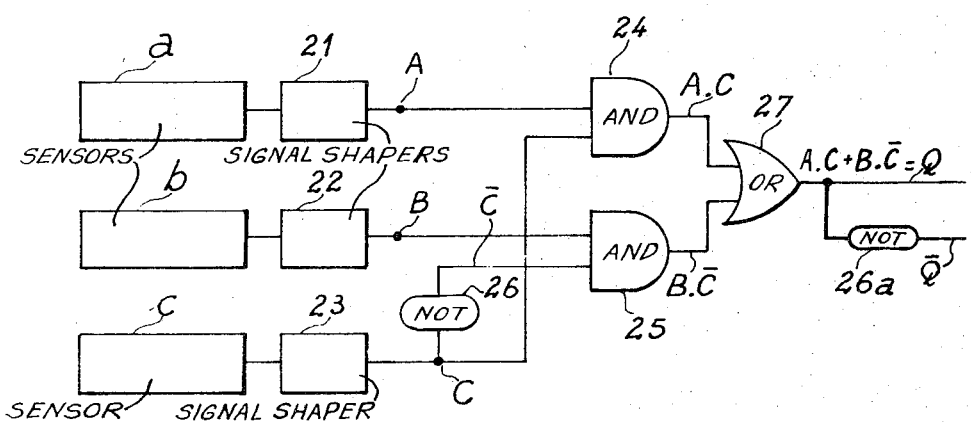
FIG. 3 is a logic diagram of an embodiment of part of the system according to the invention.

To take into account the preceding, FIG. 3 shows that the signals A and C are applied to the inputs of an AND gate 24, while the signal B is transmitted to one of the inputs of a second AND gate 25 the other input of which is connected via a NOT circuit 26 to the output of the shaping circuit 23, namely the transistor $T_4$. In this way, the second AND gate 25 receives at its inputs the signal B and also the complementary signal of C, namely the signal $\overline{C}$.

When one of the signals A of state 1 and the signal C of state 1 coincide, a signal A.C. also of state 1 is obtained at the output of the AND gate 24. This signal, as shown in FIG. 5, eliminates the setting error of the camshaft with respect to the crankshaft since the signal A of state 1 is produced by construction when the crankshaft wiper 10 has rotated 30°, whereas the signal C is also produced by construction after a 7.5° rotation of the timing wiper, which corresponds to a 15° rotation of the crankshaft. Consequently, it is of little importance that there is an error of plus or minus 10° in the setting of the camshaft with respect to the crankshaft.

In a similar manner a signal B.$\overline{C}$. of state 1 is obtained at the output of the AND gate 25, but only when a signal B of state 1 corresponds to a signal C of state 0 owing to the presence of the NOT circuit 26. For the same reasons given above, the signal B.$\overline{C}$. is independent of the setting errors existing between the crankshaft and the camshaft. By connecting the outputs of the AND gates 24 and 25 to an OR circuit 27, a signal of state 1 can be obtained only by satisfying the logical relationship A.C. + B.$\overline{C}$. = 1. This signal of state 1, which is designated by Q in FIG. 5, is thus produced whenever a signal A.C. of state 1 and a signal B.C̄. of state 1 exist at the same time. In practice, to form the AND gate 24, it is sufficient to connect the collector circuits of the transistors $T_2$ and $T_4$ respectively to the inputs of diodes $D_4$ and $D_3$ whose outputs are connected to each other and which consequently deliver the signals A.C. The AND gate 25 is likewise made up of diodes $D_5$ and $D_6$, the diode $D_5$ being connected to the collector circuit of the transistor $T_3$ and the diode $D_6$ being connected to the collector circuit of a transistor $T_5$ whose base is connected to the collector circuit of the transistor $T_4$ so that the said transistor $T_5$ constitutes an inverter which furnishes the signal C̄ forming in this way the NOT circuit 26 of FIG. 3. The outputs of the diodes $D_5$ and $D_6$ are connected to each other to produce the signals B.C̄. and those of diodes $D_7$ and $D_8$ are connected respectively to the common output of the diodes $D_5$ and $D_6$, on the one hand, and $D_3$ and $D_4$, on the other, so that the said diodes $D_7$ and $D_8$ form an OR gate at the output of which is obtained the relationship A.C.+B.C̄. and thus the signal Q (FIGS. 4 and 5). When a signal Q̄ must be available as explained hereinbelow, a NOT circuit 26a (FIG. 3) is provided which is connected to the output of the OR gate 27. The NOT circuit can be made up of a transistor $T_5$ whose base is connected to the common output of the diodes $D_7$ and $D_8$.

FIG. 5 shows that the successive signals Q of state 1 consequently correspond only to certain signals A and to certain signals B and that they are the faithful image of these signals. They thus depend only on the position of the crankshaft, without the possible setting error of the camshaft interfering with their position.

Referring again to FIG. 5, and considering the setting chosen for the sensors *a* and *b*, it is seen that the first signal Q of state 1 is produced when there is a coincidence between the first signal C of state 1 and the first signal A of state 1, this latter signal coinciding with the passage of the sector 12 in front of the sensor *a* so that the first signal Q of state 1 begins to be produced 60° before the arrival at the top dead center of piston 3b.

In the same manner, FIG. 5 shows that the second signal Q of state 1 is produced when there is no signal C of state 1, but when a signal B of state 1 is produced. The sensor *b* is offset 30° with respect to the sensor *a* and the said signal B, taken into consideration, is that produced during the passage of the sector 12b whose trailing edge is at 180° in relation to the considered initial position. As the second signal Q keeps the state 1 for 60°, the end of this second signal corresponds to a 240° rotation of the crankshaft, which corresponds to the position of the top dead center of the piston 3c since this top dead center is offset 150° in relation to that of piston 3b.

From the foregoing, it is seen that each signal Q of state 1 begins 60° before the arrival at the top dead center of each of the pistons of the engine and, consequently, each signal Q can be used to trigger an ignition spark in this angular interval preceding the arrival at the top dead center of each piston.

What is claimed is:

1. An ignition and injection control system for use in conjunction with an internal combustion engine comprising a crankshaft wiper having a series of identical alternating sectors and notches, each of said sectors and notches having an angle in the center having a common divisor with the successive angles made by the pistons between their respective dead centers during a complete engine operating cycle, said wiper being mounted for rotation with the crankshaft;

first proximity detector means stationarily mounted near the crankshaft wiper and comprising at least one sensor for producing at least one series of signals each of which terminates at a dead center of a piston;

a timing wiper carried by the engine camshaft and rotating at half the speed of the crankshaft, said timing wiper having alternating sectors and notches the number of which is equal to no more than the number of cylinders in the engine and the arrangement of which corresponds to the angular offset of the cycles specific to each cylinder of the engine;

second proximity detector means having a sensor stationarily mounted near said timing wiper and forming, with the end of each sector corresponding to the dead center of a piston, a lead angle whose value is equal to at least half the absolute value of the error angle which can exist between the crankshaft and the camshaft for producing successive signals in advance with respect to the considered dead center of each piston but with unprecise leading and trailing edges; and logic circuit comparison means connected to said first and second proximity detector means for producing a resultant signal, in advance with respect to the said dead center of each piston, whenever a correspondence exists between signals produced by said first and second proximity detector means, so that the imprecision of the signal coming from the timing wiper is corrected by the signals coming from the crankshaft wiper.

2. System according to claim 1 wherein each sensor of said first proximity detector means is successively lined up with the rear edge of a sector of said crankshaft wiper for the top dead center position of a piston, so that the signal produced from each sector and applied to the logic-circuit-type comparison device is in advance with respect to the top dead center by an angle corresponding to the length of the said sector and to that by which the crankshaft rotates.

3. A system according to claim 1 wherein said crankshaft wiper includes three sectors of 60° each, said sectors being separated by three notches each extending over 60°;

said first proximity detector means has two sensors, one of said sensors being aligned with one angular extreme of one of said sectors when a piston is at its top dead center, and the other of said sensors being separated angularly from the first by 30° in the direction of rotation of said crankshaft wiper;

said timing wiper includes three sectors of 60° each, said sectors being separated by three notches each extending over 60°; and said second proximity detector means has one sensor angularly separated from the end of a sector when a piston is at its top dead center, by an angle equal to one-half the absolute value of the maximum angular setting error possible between the crankshaft and the camshaft, whereby said second proximity detector means forms signals in advance of the dead center and said first proximity detector means produces two series of signals in phase with the position of the crankshaft.

4. A system according to claim 3 wherein
said logic circuit comparison means includes
means for producing signals complementary to the signals from said second detector means; and
means responsive to correspondence between a signal from the first sensor of said first detector means and a signal from the second detector means, and to correspondence between a signal from the second sensor from said first detector and a signal complementary to a signal from said second detector for producing resultant signals extending over an angular internal corresponding to the 60° rotation of the crankshaft before the dead center of each piston, the resultant signals being alternately spaced by intervals of 30° and 90°.

5. A system according to claim 1 wherein said first detector means has two sensors and wherein
said logic circuit means includes first and second logic gates each having one input connected to receive signals from said two sensors of said first detector means,
said first gate having a second input connected to receive signals from said second detector means;

a third logic gate connected to receive signals from said second detector means and to provide output signals complementary thereto,
said second gate being connected to receive the output of said third gate;
a fourth logic gate connected to receive the outputs of said first and second gates and to provide the resultant output signals.

* * * * *

UNITED STATES PATENT OFFICE
CERTIFICATE OF CORRECTION

Patent No. 3,830,207  Dated August 20, 1974

Inventor(s) Henri Joseph Sauvignet

It is certified that error appears in the above-identified patent and that said Letters Patent are hereby corrected as shown below:

The inventor's name should read as follows:

Henri Joseph Sauvignet

Signed and sealed this 15th day of July 1975.

(SEAL)
Attest:

RUTH C. MASON
Attesting Officer

C. MARSHALL DANN
Commissioner of Patents
and Trademarks